US012647489B2

(12) United States Patent　　　　　(10) Patent No.:　US 12,647,489 B2
Schulz et al.　　　　　　　　　　　(45) Date of Patent:　　*Jun. 2, 2026

---

(54) PROGRAMMABLE INTEGRATED CIRCUIT CONFIGURED AS A REMOTE TRUST ANCHOR TO SUPPORT MULTITENANCY

(71) Applicant: Intel Corporation, Santa Clara, CA (US)

(72) Inventors: Steffen Schulz, Darmstadt (DE); Patrick Koeberl, Portland, OR (US); Alpa Narendra Trivedi, Hillsboro, OR (US); Scott Weber, Piedmont, CA (US)

(73) Assignee: Intel Corporation, Santa Clara, CA (US)

( * ) Notice: Subject to any disclaimer, the term of this patent is extended or adjusted under 35 U.S.C. 154(b) by 28 days.

This patent is subject to a terminal disclaimer.

(21) Appl. No.: 18/410,707

(22) Filed: Jan. 11, 2024

(65) Prior Publication Data

US 2024/0314213 A1　　　Sep. 19, 2024

Related U.S. Application Data

(63) Continuation of application No. 16/832,593, filed on Mar. 27, 2020, now Pat. No. 11,895,201.

(51) Int. Cl.
　H04L 67/51　　　(2022.01)
　H04L 9/40　　　(2022.01)
　H04L 67/00　　　(2022.01)
(52) U.S. Cl.
　CPC .............. *H04L 67/51* (2022.05); *H04L 63/08* (2013.01); *H04L 67/00* (2013.01)

(58) Field of Classification Search
None
See application file for complete search history.

(56) References Cited

U.S. PATENT DOCUMENTS

| | | | |
|---|---|---|---|
| 6,851,062 B2 | 2/2005 | Hartmann et al. | |
| 9,191,617 B1 * | 11/2015 | James | ................... H04N 7/152 |
| 9,548,991 B1 | 1/2017 | Holden | |

(Continued)

FOREIGN PATENT DOCUMENTS

WO　　　　2012027478 A1　　3/2012

OTHER PUBLICATIONS

Xilnix, "Fault Tolerance in Safety Critical Applications", Copyright 2020, retrieved on Mar. 26, 2020, retrieved from https://www.xilinx.com/applications/isolation-design-ftow.html.

(Continued)

*Primary Examiner* — Kaveh Abrishamkar
(74) *Attorney, Agent, or Firm* — Fletcher Yoder, P.C.

(57)　　　　　ABSTRACT

A multitenancy system that includes a host provider, a programmable device, and multiple tenants is provided. The host provider may publish a multitenancy mode sharing and allocation policy that includes a list of terms to which the programmable device and tenants can adhere. The programmable device may include a secure device manager configured to operate in a multitenancy mode to load a tenant persona into a given partial reconfiguration (PR) sandbox region on the programmable device. The secure device manager may be used to enforce spatial isolation between different PR sandbox regions and temporal isolation between successive tenants in one PR sandbox region.

23 Claims, 12 Drawing Sheets

(56)  References Cited

U.S. PATENT DOCUMENTS

| | | | |
|---|---|---|---|
| 9,705,873 B2 | 7/2017 | Bishop et al. | |
| 11,328,111 B2 * | 5/2022 | Schulz | H04L 63/065 |
| 11,354,482 B2 * | 6/2022 | Trivedi | H04L 63/20 |
| 11,537,761 B2 * | 12/2022 | Schulz | G06F 11/0709 |
| 11,556,677 B2 * | 1/2023 | Turan | G06F 11/3058 |
| 11,895,201 B2 * | 2/2024 | Schulz | H04L 67/00 |
| 2009/0259824 A1 * | 10/2009 | Smith | H03K 19/17752 |
| | | | 712/E9.002 |
| 2013/0254872 A1 | 9/2013 | Lawson et al. | |
| 2014/0074641 A1 * | 3/2014 | Wang | H04L 43/08 |
| | | | 718/103 |
| 2014/0330936 A1 * | 11/2014 | Factor | H04L 63/0281 |
| | | | 709/219 |
| 2015/0195303 A1 | 7/2015 | Holden et al. | |
| 2017/0093903 A1 * | 3/2017 | Sakalanaga | H04L 63/1433 |
| 2017/0195173 A1 * | 7/2017 | Izenberg | G06F 9/5044 |
| 2017/0257384 A1 | 9/2017 | Nadeau et al. | |
| 2018/0095670 A1 | 4/2018 | Bradley et al. | |
| 2018/0139110 A1 * | 5/2018 | Johnson | H04L 41/5096 |
| 2018/0302281 A1 * | 10/2018 | Khan | H04L 12/4633 |
| 2018/0302299 A1 * | 10/2018 | Sun | H04L 41/5019 |
| 2019/0005228 A1 * | 1/2019 | Singh | G06F 9/45558 |
| 2019/0095567 A1 | 3/2019 | Weber et al. | |
| 2019/0129729 A1 * | 5/2019 | Peterkofsky | G06F 9/5072 |
| 2019/0158575 A1 | 5/2019 | Jan | |
| 2021/0112073 A1 * | 4/2021 | Schulz | G06F 9/505 |

OTHER PUBLICATIONS

Extended European Search Report for EP 20207958.8 dated May 28, 2021.
Extended European Search Report for EP 24186400.8 dated Aug. 8, 2024.

* cited by examiner

CIRCUIT DESIGN SYSTEM
(E.G., ONE OR MORE NETWORKED
COMPUTERS WITH PROCESSORS, MEMORY,
MASS STORAGE, ETC.)

CAD TOOL(S) — 320

DATABASE(S) — 330

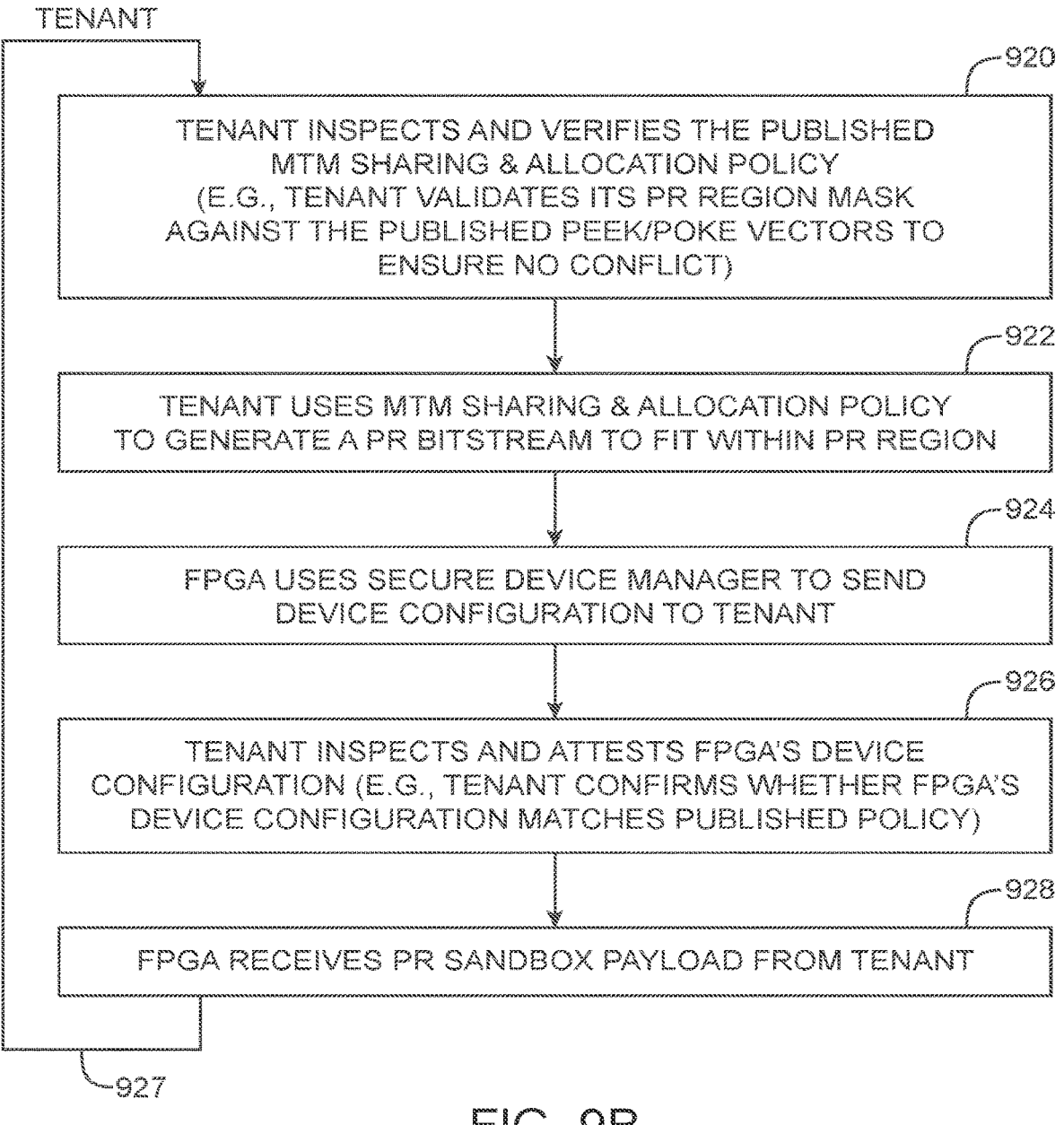

FOR EACH
TENANT

920

TENANT INSPECTS AND VERIFIES THE PUBLISHED
MTM SHARING & ALLOCATION POLICY
(E.G., TENANT VALIDATES ITS PR REGION MASK
AGAINST THE PUBLISHED PEEK/POKE VECTORS TO
ENSURE NO CONFLICT)

922

TENANT USES MTM SHARING & ALLOCATION POLICY
TO GENERATE A PR BITSTREAM TO FIT WITHIN PR REGION

924

FPGA USES SECURE DEVICE MANAGER TO SEND
DEVICE CONFIGURATION TO TENANT

926

TENANT INSPECTS AND ATTESTS FPGA'S DEVICE
CONFIGURATION (E.G., TENANT CONFIRMS WHETHER FPGA'S
DEVICE CONFIGURATION MATCHES PUBLISHED POLICY)

928

FPGA RECEIVES PR SANDBOX PAYLOAD FROM TENANT

PROGRAMMABLE INTEGRATED CIRCUIT CONFIGURED AS A REMOTE TRUST ANCHOR TO SUPPORT MULTITENANCY

BACKGROUND

A programmable logic device can be configured to support a multi-tenant usage model. A multi-tenant usage model arises where a single device is provisioned by a server to support N clients. It is assumed that the clients do not trust each other, that the clients do not trust the server, and that the server does not trust the clients. The multi-tenant model is configured using a base configuration followed by an arbitrary number of partial reconfigurations (i.e., a process that changes only a subset of configuration bits while the rest of the device continues to execute). The server is typically managed by some trusted party such as a cloud service provider.

In a conventional multitenancy scenario, the programming and sharing of resources on the programmable logic device are managed by the cloud service provider. In particular, the cloud service provider may use a software constraint checker to validate bitstreams from the multiple tenants to determine whether each tenant bitstream adheres to a set of predefined multitenancy rules established for the programmable device. The software constraint checker, however, requires plaintext access, so this solution does not work well for encrypted client intellectual property (IP) and is even more difficult to extend to third party IP. Moreover, the tenants have no assurance that the cloud service provider correctly executes the software constraint checker prior to uploading other tenant bitstreams and no assurance that the cloud service provider manages the multitenancy in accordance with the predefined rules.

It is within this context that the embodiments described herein arise.

BRIEF DESCRIPTION OF THE DRAWINGS

FIGS. 9A-9C are flow charts of illustrative steps for operating a multitenancy system in accordance with an embodiment.

DETAILED DESCRIPTION

The present embodiments relate to methods and apparatus for supporting flexible and secure sharing of programmable integrated circuit resources in the cloud among multiple tenants. A modular multitenancy secure system architecture is provided that can be customized by a cloud service provider (CSP) to satisfy resource allocation requirements while at the same time ensuring that isolation among the multiple tenants is maintained on a programmable integrated circuit device.

The programmable integrated circuit may be configured as a remote trusted anchor that allows only well-defined partial reconfigurations and enforces valid instantiations. Configured in this way, the programmable integrated circuit may run parallel workload execution from multiple tenants in self-contained execution units (e.g., to run tenant payloads in well-defined partial reconfiguration sandboxes), which reduces the burden and trust requirements on the CSP while enabling additional applications such as executing third party encrypted intellectual property (IP) in the PR sandboxes as part of a customer's design.

It will be recognized by one skilled in the art, that the present exemplary embodiments may be practiced without some or all of these specific details. In other instances, well-known operations have not been described in detail in order not to unnecessarily obscure the present embodiments.

Programmable integrated circuits use programmable memory elements to store configuration data. During programming of a programmable integrated circuit, configuration data is loaded into the memory elements. The memory elements may be organized in arrays having numerous rows and columns. For example, memory array circuitry may be formed in hundreds or thousands of rows and columns on a programmable logic device integrated circuit.

During normal operation of the programmable integrated circuit, each memory element is configured to provide a static output signal. The static output signals that are supplied by the memory elements serve as control signals. These control signals are applied to programmable logic on the integrated circuit to customize the programmable logic to perform a desired logic function.

It may sometimes be desirable to reconfigure only a portion of the memory elements during normal operation. This type of reconfiguration in which only a subset of memory elements are being loaded with new configuration data during runtime is sometimes referred to as "partial reconfiguration". During partial reconfiguration, new data should be written into a selected portion of memory elements (sometimes referred to as "memory cells").

Figure 1:
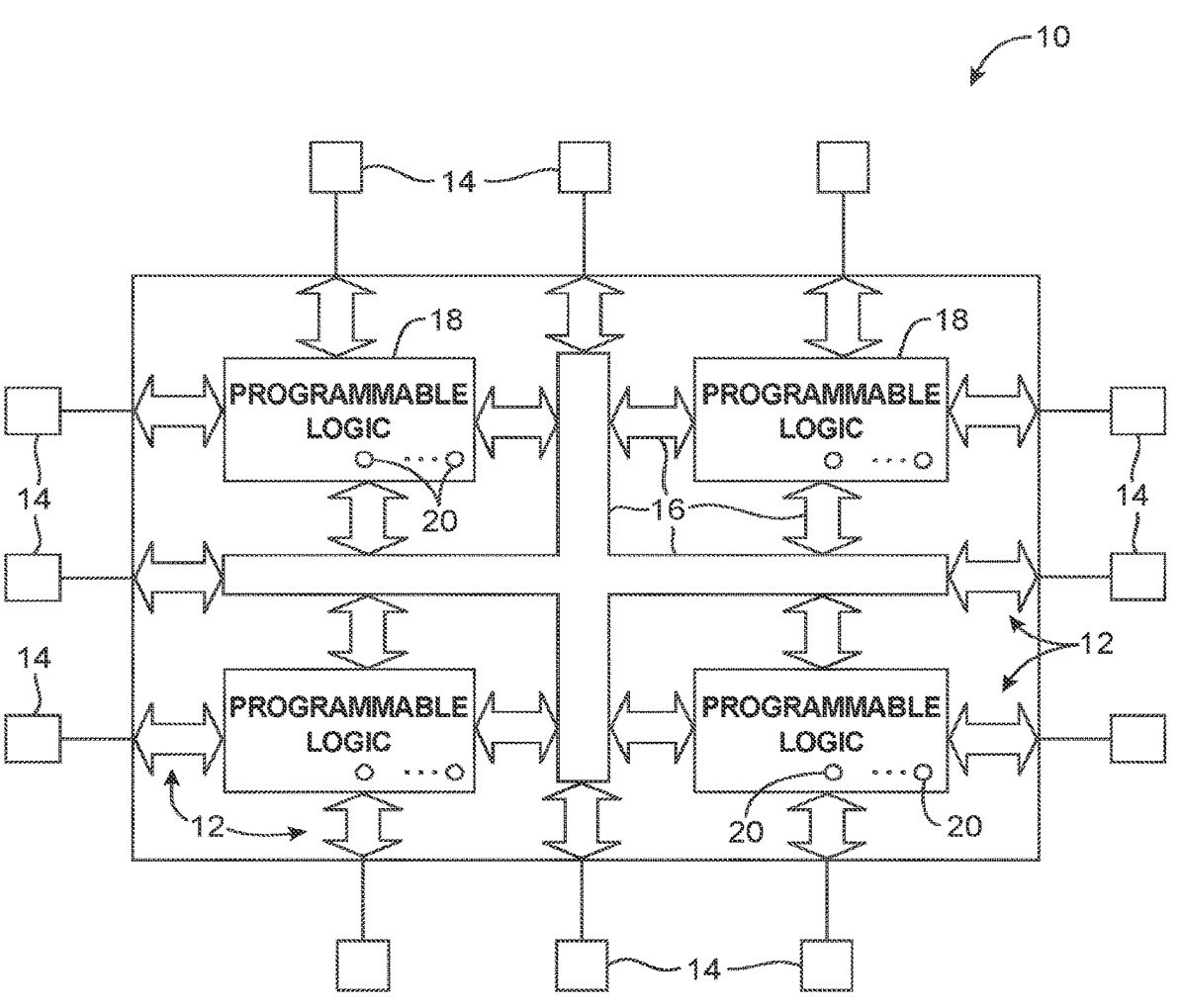
FIG. 1 is a diagram of an illustrative programmable integrated circuit in accordance with an embodiment.

An illustrative programmable integrated circuit such as programmable logic device (PLD) 10 is shown in FIG. 1. As shown in FIG. 1, programmable integrated circuit 10 may have input-output circuitry 12 for driving signals off of device 10 and for receiving signals from other devices via input-output pins 14. Interconnection resources 16 such as global and local vertical and horizontal conductive lines and buses may be used to route signals on device 10. Interconnection resources 16 include fixed interconnects (conductive lines) and programmable interconnects (i.e., programmable connections between respective fixed interconnects). Programmable logic 18 may include combinational and sequential logic circuitry. The programmable logic 18 may be configured to perform a custom logic function.

Programmable integrated circuit 10 contains memory elements 20 that can be loaded with configuration data (also called programming data) using pins 14 and input-output circuitry 12. Once loaded, the memory elements 20 may each provide a corresponding static control output signal that controls the state of an associated logic component in programmable logic 18. Typically the memory element output signals are used to control the gates of metal-oxide-semiconductor (MOS) transistors. Some of the transistors may be p-channel metal-oxide-semiconductor (PMOS) transistors. Many of these transistors may be n-channel metal-oxide-semiconductor (NMOS) pass transistors in programmable components such as multiplexers. When a memory element output is high, an NMOS pass transistor controlled by that memory element will be turned on to pass logic signals from its input to its output. When the memory element output is low, the pass transistor is turned off and does not pass logic signals.

A typical memory element 20 is formed from a number of transistors configured to form cross-coupled inverters. Other arrangements (e.g., cells with more distributed inverter-like circuits) may also be used. With one suitable approach, complementary metal-oxide-semiconductor (CMOS) integrated circuit technology is used to form the memory elements 20, so CMOS-based memory element implementations are described herein as an example. In the context of programmable integrated circuits, the memory elements store configuration data and are therefore sometimes referred to as configuration random-access memory (CRAM) cells.

Figure 2:
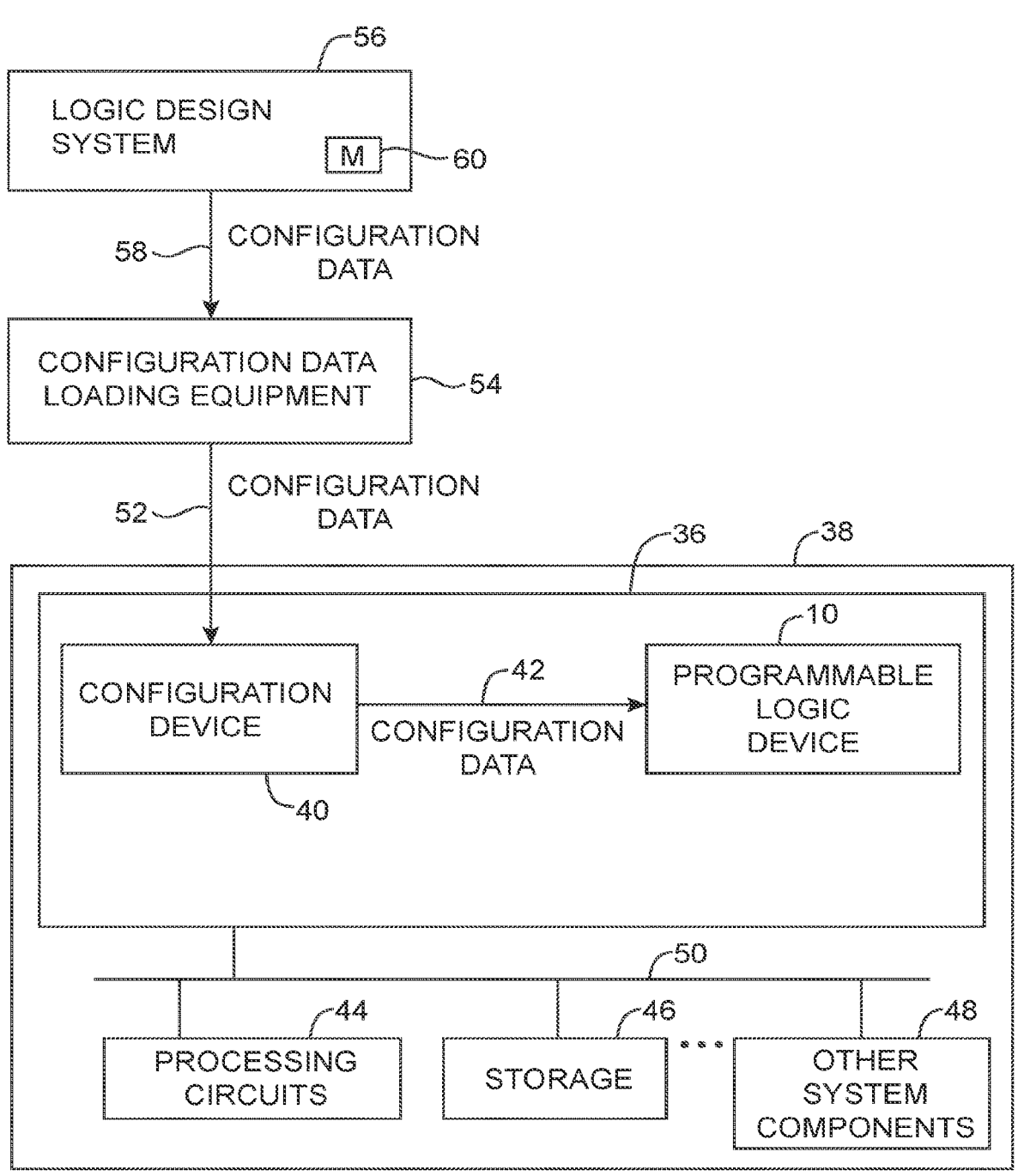
FIG. 2 is a diagram showing how configuration data is created by a logic design system and loaded into a programmable device to configure the device for operation in a system in accordance with an embodiment.

An illustrative system environment for device 10 is shown in FIG. 2. Device 10 may be mounted on a board 36 in a system 38. In general, programmable logic device 10 may receive configuration data from programming equipment or from other suitable equipment or device. In the example of FIG. 2, programmable logic device 10 is the type of programmable logic device that receives configuration data from an associated integrated circuit 40. With this type of arrangement, circuit 40 may, if desired, be mounted on the same board 36 as programmable logic device 10.

Circuit 40 may be an erasable-programmable read-only memory (EPROM) chip, a programmable logic device configuration data loading chip with built-in memory (sometimes referred to as a "configuration device"), or other suitable device. When system 38 boots up (or at another suitable time), the configuration data for configuring the programmable logic device may be supplied to the programmable logic device from device 40, as shown schematically by path 42. The configuration data that is supplied to the programmable logic device may be stored in the programmable logic device in its configuration random-access-memory elements 20.

System 38 may include processing circuits 44, storage 46, and other system components 48 that communicate with device 10. The components of system 38 may be located on one or more boards such as board 36 or other suitable mounting structures or housings and may be interconnected by buses, traces, and other electrical paths 50.

Configuration device 40 may be supplied with the configuration data for device 10 over a path such as path 52. Configuration device 40 may, for example, receive the configuration data from configuration data loading equipment 54 or other suitable equipment that stores this data in configuration device 40. Device 40 may be loaded with data before or after installation on board 36.

As shown in FIG. 2, the configuration data produced by a logic design system 56 may be provided to equipment 54 over a path such as path 58. The equipment 54 provides the configuration data to device 40, so that device 40 can later provide this configuration data to the programmable logic device 10 over path 42. Logic design system 56 may be based on one or more computers and one or more software programs. In general, software and data may be stored on any computer-readable medium (storage) in system 56 and is shown schematically as storage 60 in FIG. 2.

In a typical scenario, logic design system 56 is used by a logic designer to create a custom circuit design. The system 56 produces corresponding configuration data which is provided to configuration device 40. Upon power-up, configuration device 40 and data loading circuitry on programmable logic device 10 is used to load the configuration data into CRAM cells 20 of device 10. Device 10 may then be used in normal operation of system 38.

After device 10 is initially loaded with a set of configuration data (e.g., using configuration device 40), device 10 may be reconfigured by loading a different set of configuration data. Sometimes it may be desirable to reconfigure only a portion of the memory cells on device 10 via a process sometimes referred to as partial reconfiguration. As memory cells are typically arranged in an array, partial reconfiguration can be performed by writing new data values only into selected portion(s) in the array while leaving portions of array other than the selected portion(s) in their original state.

It can be a significant undertaking to design and implement a desired (custom) logic circuit in a programmable logic device. Logic designers therefore generally use logic design systems based on computer-aided-design (CAD) tools to assist them in designing circuits. A logic design system can help a logic designer design and test complex circuits for a system. When a design is complete, the logic design system may be used to generate configuration data for electrically programming the appropriate programmable logic device.

Figure 3:
FIG. 3 is a diagram of a circuit design system that may be used to design integrated circuits in accordance with an embodiment.
Figure 3:
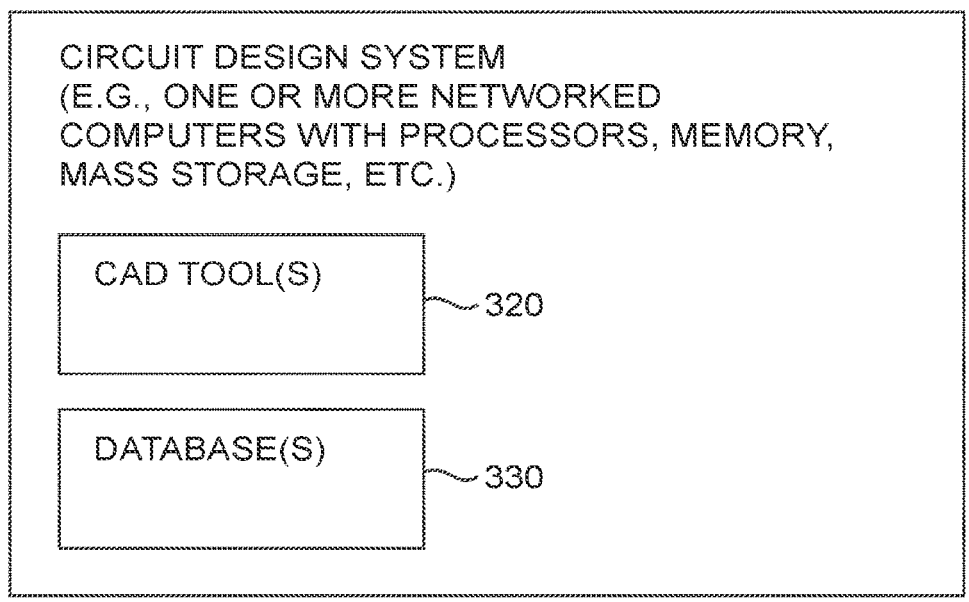

An illustrative logic circuit design system 300 in accordance with an embodiment is shown in FIG. 3. If desired, circuit design system of FIG. 3 may be used in a logic design system such as logic design system 56 shown in FIG. 2. Circuit design system 300 may be implemented on integrated circuit design computing equipment. For example, system 300 may be based on one or more processors such as personal computers, workstations, etc. The processor(s) may be linked using a network (e.g., a local or wide area network). Memory in these computers or external memory and storage devices such as internal and/or external hard disks may be used to store instructions and data.

Software-based components such as computer-aided design tools 320 and databases 330 reside on system 300. During operation, executable software such as the software of computer aided design tools 320 runs on the processor(s) of system 300. Databases 330 are used to store data for the operation of system 300. In general, software and data may be stored on non-transitory computer readable storage media (e.g., tangible computer readable storage media). The software code may sometimes be referred to as software, data, program instructions, instructions, or code. The non-transitory computer readable storage media may include computer memory chips, non-volatile memory such as non-volatile random-access memory (NVRAM), one or more hard drives (e.g., magnetic drives or solid state drives), one or more removable flash drives or other removable media, compact discs (CDs), digital versatile discs (DVDs), Blu-ray discs (BDs), other optical media, and floppy diskettes, tapes, or any other suitable memory or storage device(s).

Software stored on the non-transitory computer readable storage media may be executed on system 300. When the software of system 300 is installed, the storage of system 300 has instructions and data that cause the computing equipment in system 300 to execute various methods (processes). When performing these processes, the computing equipment is configured to implement the functions of circuit design system 300.

The computer aided design (CAD) tools 320, some or all of which are sometimes referred to collectively as a CAD tool, a circuit design tool, or an electronic design automation (EDA) tool, may be provided by a single vendor or by multiple vendors. Tools 320 may be provided as one or more suites of tools (e.g., a compiler suite for performing tasks associated with implementing a circuit design in a programmable logic device) and/or as one or more separate software components (tools). Database(s) 330 may include one or more databases that are accessed only by a particular tool or tools and may include one or more shared databases. Shared databases may be accessed by multiple tools. For example, a first tool may store data for a second tool in a shared database. The second tool may access the shared database to retrieve the data stored by the first tool. This allows one tool to pass information to another tool. Tools may also pass information between each other without storing information in a shared database if desired.

Figure 4:
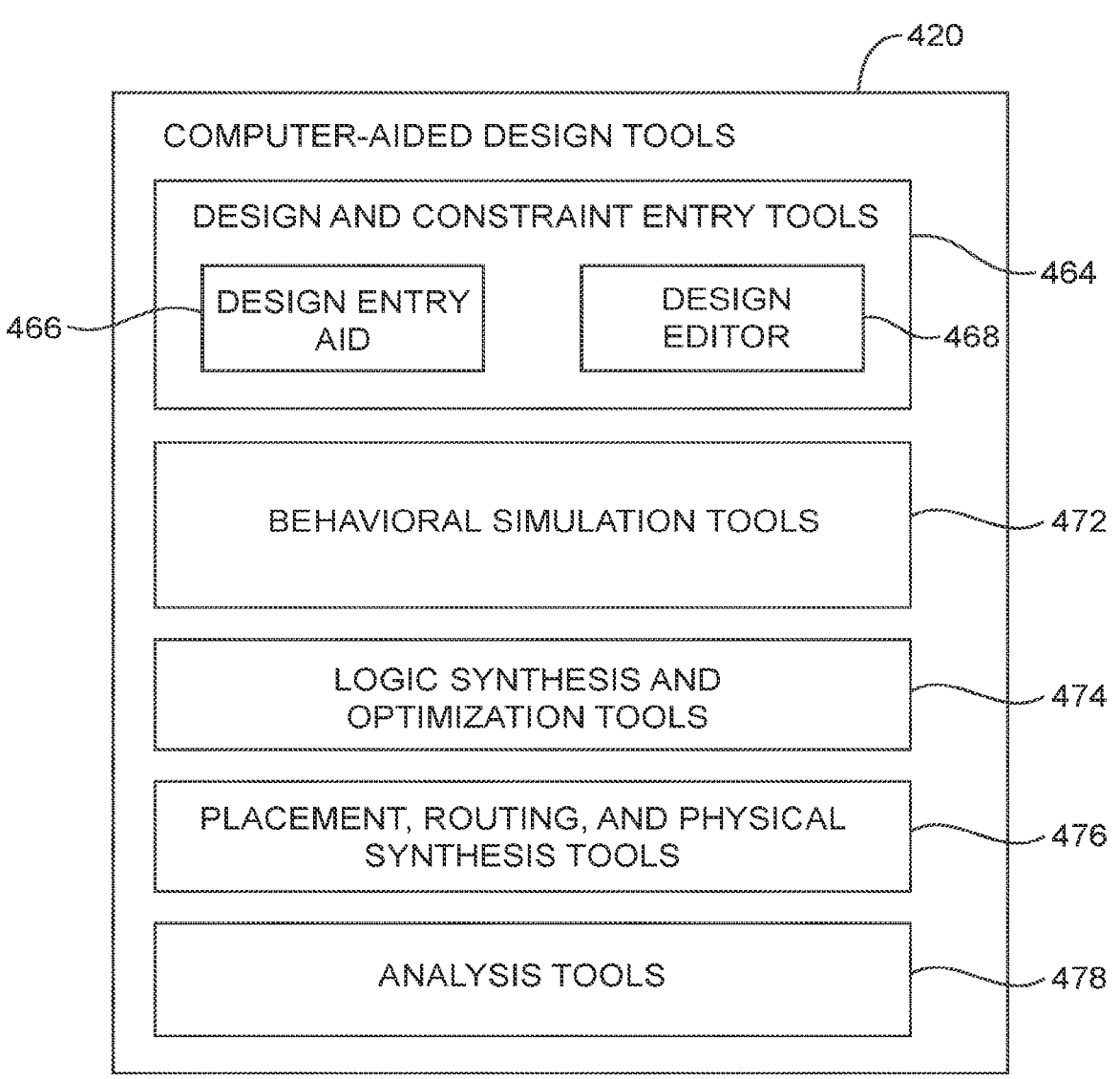
FIG. 4 is a diagram of illustrative computer-aided design (CAD) tools that may be used in a circuit design system in accordance with an embodiment.

Illustrative computer aided design tools 420 that may be used in a circuit design system such as circuit design system 300 of FIG. 3 are shown in FIG. 4.

The design process may start with the formulation of functional specifications of the integrated circuit design (e.g., a functional or behavioral description of the integrated circuit design). A circuit designer may specify the functional operation of a desired circuit design using design and constraint entry tools 464. Design and constraint entry tools 464 may include tools such as design and constraint entry aid 466 and design editor 468. Design and constraint entry aids such as aid 466 may be used to help a circuit designer locate a desired design from a library of existing circuit designs and may provide computer-aided assistance to the circuit designer for entering (specifying) the desired circuit design.

As an example, design and constraint entry aid 466 may be used to present screens of options for a user. The user may click on on-screen options to select whether the circuit being designed should have certain features. Design editor 468 may be used to enter a design (e.g., by entering lines of hardware description language code), may be used to edit a design obtained from a library (e.g., using a design and constraint entry aid), or may assist a user in selecting and editing appropriate prepackaged code/designs.

Design and constraint entry tools 464 may be used to allow a circuit designer to provide a desired circuit design using any suitable format. For example, design and constraint entry tools 464 may include tools that allow the circuit designer to enter a circuit design using truth tables. Truth tables may be specified using text files or timing diagrams and may be imported from a library. Truth table circuit design and constraint entry may be used for a portion of a large circuit or for an entire circuit.

As another example, design and constraint entry tools 464 may include a schematic capture tool. A schematic capture tool may allow the circuit designer to visually construct integrated circuit designs from constituent parts such as logic gates and groups of logic gates. Libraries of preexisting integrated circuit designs may be used to allow a desired portion of a design to be imported with the schematic capture tools.

If desired, design and constraint entry tools 464 may allow the circuit designer to provide a circuit design to the circuit design system 300 using a hardware description language such as Verilog hardware description language (Verilog HDL), Very High Speed Integrated Circuit Hardware Description Language (VHDL), SystemVerilog, or a higher-level circuit description language such as OpenCL or SystemC, just to name a few. The designer of the integrated circuit design can enter the circuit design by writing hardware description language code with editor 468. Blocks of code may be imported from user-maintained or commercial libraries if desired.

After the design has been entered using design and constraint entry tools 464, behavioral simulation tools 472 may be used to simulate the functionality of the circuit design. If the functionality of the design is incomplete or incorrect, the circuit designer can make changes to the circuit design using design and constraint entry tools 464. The functional operation of the new circuit design may be verified using behavioral simulation tools 472 before synthesis operations have been performed using tools 474. Simulation tools such as behavioral simulation tools 472 may also be used at other stages in the design flow if desired (e.g., after logic synthesis). The output of the behavioral simulation tools 472 may be provided to the circuit designer in any suitable format (e.g., truth tables, timing diagrams, etc.).

Once the functional operation of the circuit design has been determined to be satisfactory, logic synthesis and optimization tools 474 may generate a gate-level netlist of the circuit design, for example using gates from a particular library pertaining to a targeted process supported by a foundry, which has been selected to produce the integrated circuit. Alternatively, logic synthesis and optimization tools 474 may generate a gate-level netlist of the circuit design using gates of a targeted programmable logic device (i.e., in the logic and interconnect resources of a particular programmable logic device product or product family).

Logic synthesis and optimization tools 474 may optimize the design by making appropriate selections of hardware to implement different logic functions in the circuit design based on the circuit design data and constraint data entered by the logic designer using tools 464. As an example, logic synthesis and optimization tools 474 may perform multi-level logic optimization and technology mapping based on the length of a combinational path between registers in the circuit design and corresponding timing constraints that were entered by the logic designer using tools 464.

After logic synthesis and optimization using tools 474, the circuit design system may use tools such as placement, routing, and physical synthesis tools 476 to perform physical design steps (layout synthesis operations). Tools 476 can be used to determine where to place each gate of the gate-level netlist produced by tools 474. For example, if two counters interact with each other, tools 476 may locate these counters in adjacent regions to reduce interconnect delays or to satisfy timing requirements specifying the maximum permitted interconnect delay. Tools 476 create orderly and efficient implementations of circuit designs for any targeted integrated circuit (e.g., for a given programmable integrated circuit such as a field-programmable gate array (FPGA)).

Tools such as tools 474 and 476 may be part of a compiler suite (e.g., part of a suite of compiler tools provided by a programmable logic device vendor). In certain embodiments, tools such as tools 474, 476, and 478 may also include timing analysis tools such as timing estimators. This allows tools 474 and 476 to satisfy performance requirements (e.g., timing requirements) before actually producing the integrated circuit.

After an implementation of the desired circuit design has been generated using tools 476, the implementation of the design may be analyzed and tested using analysis tools 478. For example, analysis tools 478 may include timing analysis tools, power analysis tools, or formal verification tools, just to name few.

After satisfactory optimization operations have been completed using tools 420 and depending on the targeted integrated circuit technology, tools 420 may produce a mask-level layout description of the integrated circuit or configuration data for programming the programmable logic device.

Figure 5:
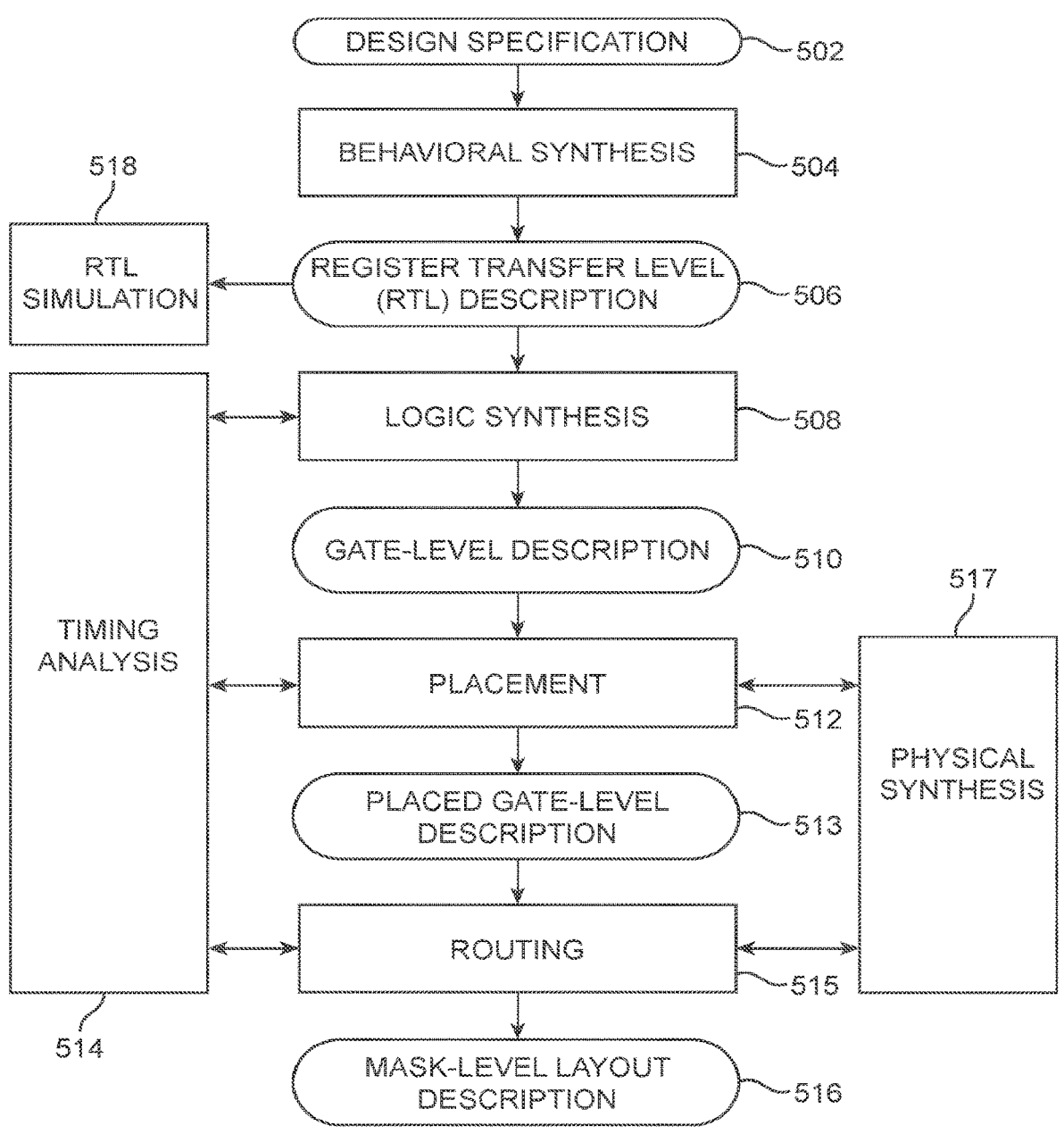
FIG. 5 is a flow chart of illustrative steps for designing an integrated circuit in accordance with an embodiment.

Illustrative operations involved in using tools 420 of FIG. 4 to produce the mask-level layout description of the integrated circuit are shown in FIG. 5. As shown in FIG. 5, a circuit designer may first provide a design specification 502. The design specification 502 may, in general, be a behavioral description provided in the form of an application code (e.g., C code, C++ code, SystemC code, OpenCL code, etc.). In some scenarios, the design specification may be provided in the form of a register transfer level (RTL) description 506.

The RTL description may have any form of describing circuit functions at the register transfer level. For example, the RTL description may be provided using a hardware description language such as the Verilog hardware description language (Verilog HDL or Verilog), the SystemVerilog hardware description language (SystemVerilog HDL or SystemVerilog), or the Very High Speed Integrated Circuit Hardware Description Language (VHDL). If desired, a portion or all of the RTL description may be provided as a schematic representation or in the form of a code using OpenCL, MATLAB, Simulink, or other high-level synthesis (HLS) language.

In general, the behavioral design specification 502 may include untimed or partially timed functional code (i.e., the application code does not describe cycle-by-cycle hardware behavior), whereas the RTL description 506 may include a fully timed design description that details the cycle-by-cycle behavior of the circuit at the register transfer level.

Design specification 502 or RTL description 506 may also include target criteria such as area use, power consumption, delay minimization, clock frequency optimization, or any combination thereof. The optimization constraints and target criteria may be collectively referred to as constraints.

Those constraints can be provided for individual data paths, portions of individual data paths, portions of a design, or for the entire design. For example, the constraints may be provided with the design specification 502, the RTL description 506 (e.g., as a pragma or as an assertion), in a constraint file, or through user input (e.g., using the design and constraint entry tools 464 of FIG. 4), to name a few.

At step 504, behavioral synthesis (sometimes also referred to as algorithmic synthesis) may be performed to convert the behavioral description into an RTL description 506. Step 504 may be skipped if the design specification is already provided in form of an RTL description.

At step 518, behavioral simulation tools 472 may perform an RTL simulation of the RTL description, which may verify the functionality of the RTL description. If the functionality of the RTL description is incomplete or incorrect, the circuit designer can make changes to the HDL code (as an example). During RTL simulation 518, actual results obtained from simulating the behavior of the RTL description may be compared with expected results.

During step 508, logic synthesis operations may generate gate-level description 510 using logic synthesis and optimization tools 474 from FIG. 4. The output of logic synthesis 508 is a gate-level description 510 of the design.

During step 512, placement operations using for example placement tools 476 of FIG. 4 may place the different gates in gate-level description 510 in a preferred location on the targeted integrated circuit to meet given target criteria (e.g., minimize area and maximize routing efficiency or minimize path delay and maximize clock frequency or minimize overlap between logic elements, or any combination thereof). The output of placement 512 is a placed gate-level description 513, which satisfies the legal placement constraints of the underlying target device.

During step 515, routing operations using for example routing tools 476 of FIG. 4 may connect the gates from the placed gate-level description 513. Routing operations may attempt to meet given target criteria (e.g., minimize congestion, minimize path delay and maximize clock frequency, satisfy minimum delay requirements, or any combination thereof). The output of routing 515 is a mask-level layout description 516 (sometimes referred to as routed gate-level description 516). The mask-level layout description 516 generated by the design flow of FIG. 5 may sometimes be referred to as a device configuration bit stream or a device configuration image.

While placement and routing is being performed at steps 512 and 515, physical synthesis operations 517 may be concurrently performed to further modify and optimize the circuit design (e.g., using physical synthesis tools 476 of FIG. 4).

Programmable integrated circuit device 10 may be configured using tools described in FIGS. 2-5 to support a multi-tenant usage model or scenario. Examples of programmable logic devices include programmable arrays logic (PALs), programmable logic arrays (PLAs), field programmable logic arrays (FPLAs), electrically programmable logic devices (EPLDs), electrically erasable programmable logic devices (EEPLDs), logic cell arrays (LCAs), complex programmable logic devices (CPLDs), and field programmable gate arrays (FPGAs), just to name a few. System configurations in which device 10 is a programmable logic device such as an FPGA is sometimes described as an example but is not intended to limit the scope of the present embodiments.

Figure 6:
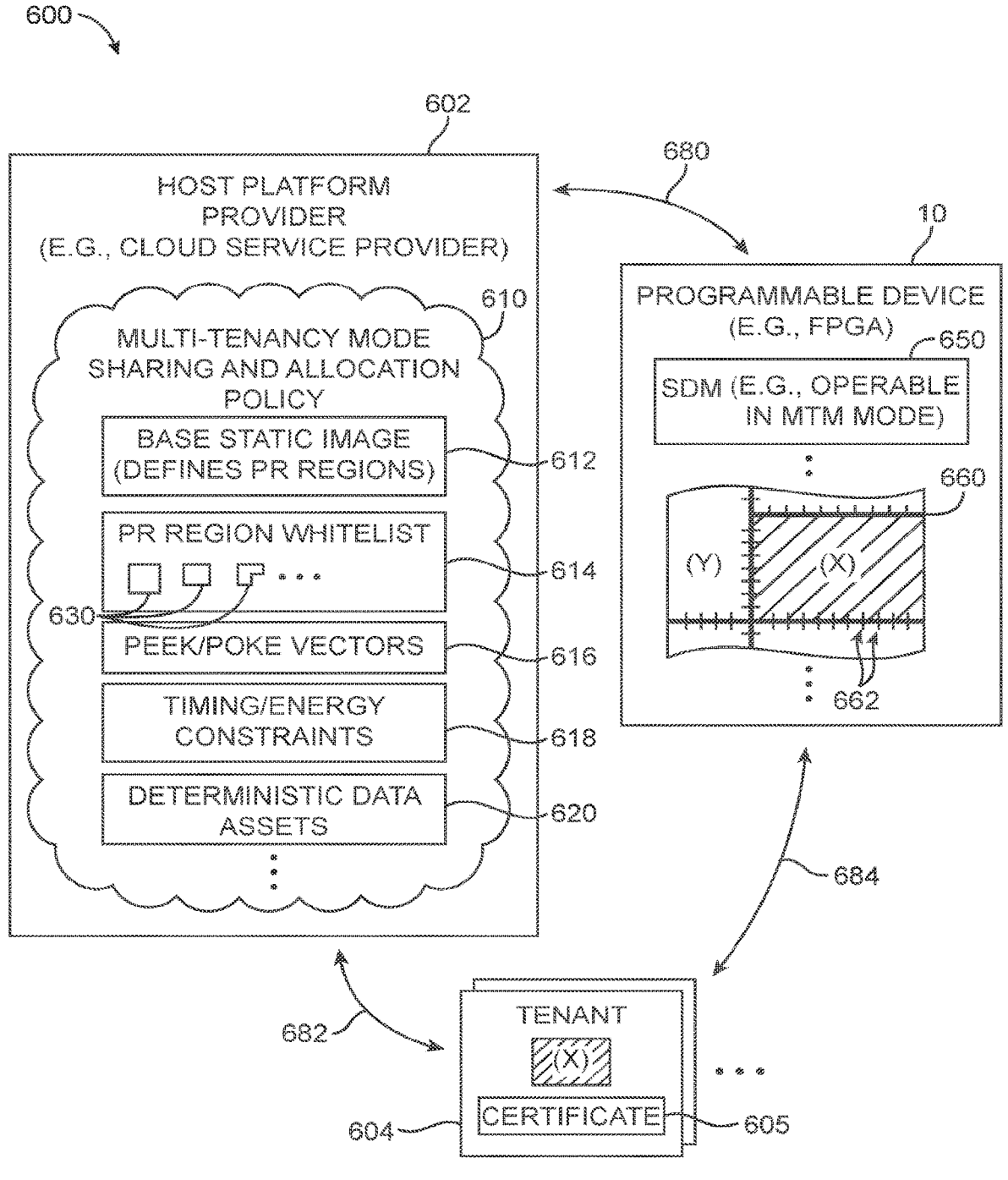
FIG. 6 is a diagram of an illustrative multitenancy system in accordance with an embodiment.

In accordance with an embodiment, FIG. 6 is a diagram of a multitenancy system such as system 600. As shown in FIG. 6, system 600 may include at least a host platform provider 602 (e.g., a server, a cloud service provider or "CSP"), a programmable integrated circuit device 10 such as an FPGA, and multiple tenants 604 (sometimes referred to as "clients"). The CSP 602 may interact with FPGA 10 via communications path 680 and may, in parallel, interact with tenants 604 via communications path 682. The FPGA 10 may separately interact with tenants 604 via communications path 684. In a multitenant usage model, FPGA 10 may be provisioned by the CSP 602 to support each of various tenants/clients 604 running their own separate applications. It may be assumed that the tenants do not trust each other, that the clients do not trust the CSP, and that the CSP does not trust the tenants.

Cloud service provider 602 may provide cloud services accelerated on one or more accelerator devices such as application-specific integrated circuits (ASICs), graphics processor units (GPUs), and FPGAs to multiple cloud customers (i.e., tenants). In the context of FPGA-as-a-service usage model, cloud service provider 602 may offload more than one workload to an FPGA 10 so that multiple tenant workloads may run simultaneously on the FPGA as different partial reconfiguration (PR) workloads. In such scenarios, FPGA 10 needs to provide necessary security assurances and PR workload isolation when security-sensitive workloads (or payloads) are executed on the FPGA.

Cloud service provider 602 may define a multitenancy mode (MTM) sharing and allocation policy 610. The MTM sharing and allocation policy 610 may set forth a base configuration bitstream such as base static image 612, a partial reconfiguration region whitelist such as PR whitelist 614, peek and poke vectors 616, timing and energy constraints 618 (e.g., timing and power requirements for each potential tenant or the overall multitenant system), deterministic data assets 620 (e.g., a hash list of binary assets or other reproducible component that can be used to verify the proper loading of tenant workloads into each PR region), etc. Policy 610 is sometimes referred to as an FPGA multitenancy mode contract. One or more components of MTM sharing and allocation policy 610 such as the base static image 612, PR region whitelist 61, and peek/poke vectors 616 may be generated by the cloud service provider using design tools 420 of FIG. 4.

Figure 7:
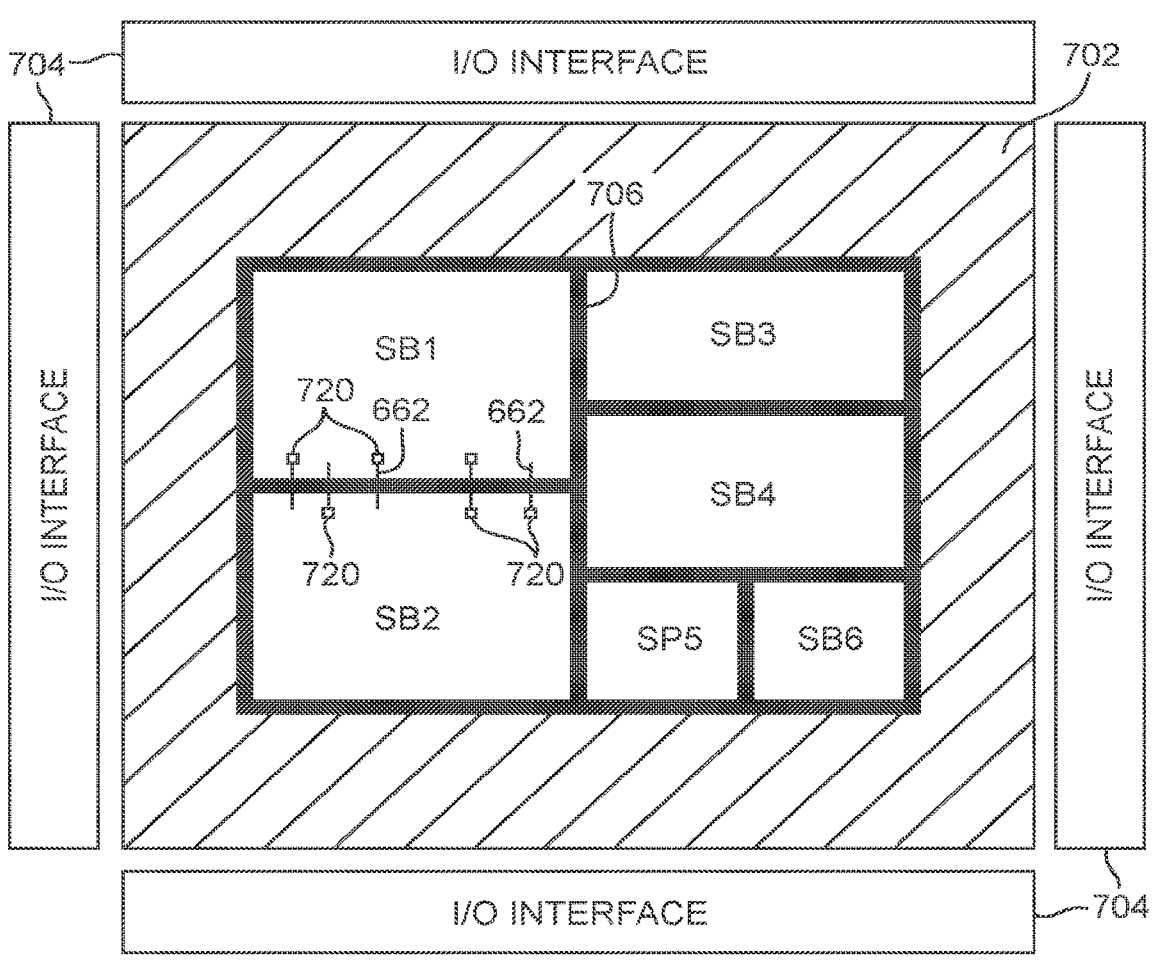
FIG. 7 is a diagram of a programmable integrated circuit having a static region and multiple partial reconfiguration (PR) sandbox regions in accordance with an embodiment.

The base static image 612 may define a base design for device 10 (see, e.g., FIG. 7). As shown in FIG. 7, the base static image 612 may define the input-output interfaces 704, one or more static region(s) 702, and multiple partial reconfiguration (PR) regions each of which may be assigned to a respective tenant to support an isolated workload. Static region 702 may be a region where all parties agree that the configuration bits cannot be changed by partial reconfiguration initiated or triggered by one of the tenants. For example, static region may be owned by and optionally updated or reconfigured by the server/host/CSP. Static region 702 may also be part of a server/host/CSP shell or platform logic. Any resource on device 10 should be assigned either to static region 702 or one of the PR regions (but not both).

The PR region whitelist 614 may define a list of available PR regions 630 (see FIG. 6). Each PR region for housing a particular tenant may be referred to as a PR "sandbox," in the sense of providing a trusted execution environment (TEE) for providing spatial/physical isolation and preventing potential undesired interference among the multiple tenants. Each PR sandbox may provide assurance that the contained PR tenant workload (sometimes referred to as the PR client persona) is limited to configured its designated subset of the FPGA fabric and is protected from access by other PR workloads. The precise allocation of the PR sandbox regions and the boundaries 660 of each PR sandbox may also be defined by the base static image. Additional reserved padding area such as area 706 in FIG. 7 may be used to avoid electrical interference and coupling effects such as crosstalk. Additional circuitry may also be formed in padding area 706 for actively detecting and/or compensating unwanted effects generated as a result of electrical interference, noise, or power surge.

Any wires such as wires 662 crossing a PR sandbox boundary may be assigned to either an associated PR sandbox or to the static region 702. If a boundary-crossing wire 662 is assigned to a PR sandbox region, routing multiplexers outside that sandbox region controlling the wire should be marked as not to be used. If a boundary-cross wire 662 is assigned to the static region, the routing multiplexers inside that sandbox region controlling the wire should be marked as not belonging to that sandbox region (e.g., these routing multiplexers should be removed from the corresponding PR region mask later described in connection with FIG. 8A).

Any hard (non-reconfigurable) embedded intellectual property (IP) blocks such as memory blocks (e.g., random-access memory blocks) or digital signal processing (DSP) blocks that are formed on FPGA 10 may also be assigned either to a PR sandbox or to the static region. In other words, any given hard IP functional block should be completely owned by a single entity (e.g., any fabric configuration for a respective embedded functional block is either allocated to a corresponding PR sandbox or the static region).

In the example of FIG. 7, there may be six PR sandbox regions such as sandbox regions SB1-SB6. The PR regions may have the same size or may have different sizes and/or shapes. In general, device 10 may include any suitable number of PR sandbox regions that are separate from static region 702.

As described above, the configuration bit provisioning is done such that the set of configuration bits associated with the control of an intellectual property (IP) block is owned by a single party. For compute elements and memory IP blocks, the ownership sets of configuration bits are organized such that the configuration bits that control the communication to and from the IP blocks are separated from the configuration bits that control the function of the compute element or memory IP blocks. The communication between the IP blocks is controlled through the configuration of routing multiplexers, and the configuration bits for a routing multiplexer is owned by a single party.

To build a design, the compute elements and memory create communication channels using the routing multiplexers. For this disclosure, it is assumed that the provisioning of configuration bit sets for compute elements, memory, and routing IP is done in a non-malicious manner so that the partial reconfiguration region and static region owners are capable of creating a functioning design that they fully control, including how it interfaces with the other partial reconfiguration regions and/or static region.

The ability for a region to peek on and/or poke at another region that is not by owned by them stems from the fact that configurable devices have a vast network of routing and a routing multiplexers owned by one region that could be configured to attach to a wire being driven by another region. With the ownership model described, this configuration would not be considered illegal and would allow the owning region to snoop on the other region and/or create parasitic loading to disrupt the function of the non-owning region.

If the region with the driver was the one creating this malicious connection, it could corrupt the receiving region by putting multiple drivers on a routing multiplexer. This configuration would be considered illegal with the ownership model described. However, the problem is symmetrical so it is also addressed in this disclosure and could occur if a party was compromised and was able to violate the ownership of configuration bits.

To facilitate "peek" attacks, the base configuration of the static and partial reconfiguration regions or a subsequent partial reconfiguration of a partial reconfiguration region would have to configure their owned routing multiplexers to snoop on another region. To prevent this, an exclusion region configuration is extracted based on the provisioning of the configuration bits to the parties involved. This exclusion region configuration also defends against the symmetrical "poke" attacks. In other words, an exclusion region defines bits that (when cleared) stop peek/poke attacks. In some embodiments, applying this exclusion region configuration through the use of partial reconfiguration disables peek and poke attacks. In some embodiments, dynamic checks against the exclusion region configuration are applied to avoid and detect peek and poke attacks.

After a trusted compilation flow has done a complete provisioning of all configuration bits to the involved parties and after every configuration bit is owned by a partial reconfiguration region or the static region, analysis on the routing occurs to create the exclusion region configuration. The trusted compilation flow has the ability to analyze where there are peek and poke possibilities based on the physical routing and configuration resources. Thus, the exclusion region may generally be defined as a set of configuration bits that is set to zero to prevent any malicious peek/poke attacks among different parties in a multi-tenant usage scenario on device 10. Such exclusion region may be defined by the peek/poke vectors 616 (FIG. 6) and may effectively serve to disconnect any long wires actively conveying signals between neighboring PR sandboxes.

As shown in FIG. 6, FPGA 10 may include a control circuit such as secure device management (SDM) circuit 650 that governs the overall FPGA fabric configuration. Secure device manager (SDM) 650 provides the ability to authorize and decrypt new configuration bitstreams based on previously provisioned platform owner keys. Secure device manager 650 may also control the overall FPGA platform operation such as allowing when the FPGA enters debug mode or handles hardware errors. Operated in this way, SDM 650 may serve as a platform root of trust that enables secure operation of authorized tenant workloads. During runtime, the SDM 650 support partial configuration by loading a new configuration bitstream associated with a given tenant (sometimes referred to as a PR "persona") that targets a particular PR sandbox region. In the example of FIG. 6, a first tenant 604 may load a first tenant persona X into a corresponding PR sandbox region on device 10, whereas a second tenant may load a second tenant persona Y into another PR sandbox region on device 10, etc. Each tenant may have a certificate 605 (or key) that is uses to authenticate device 10.

Figure 8A:
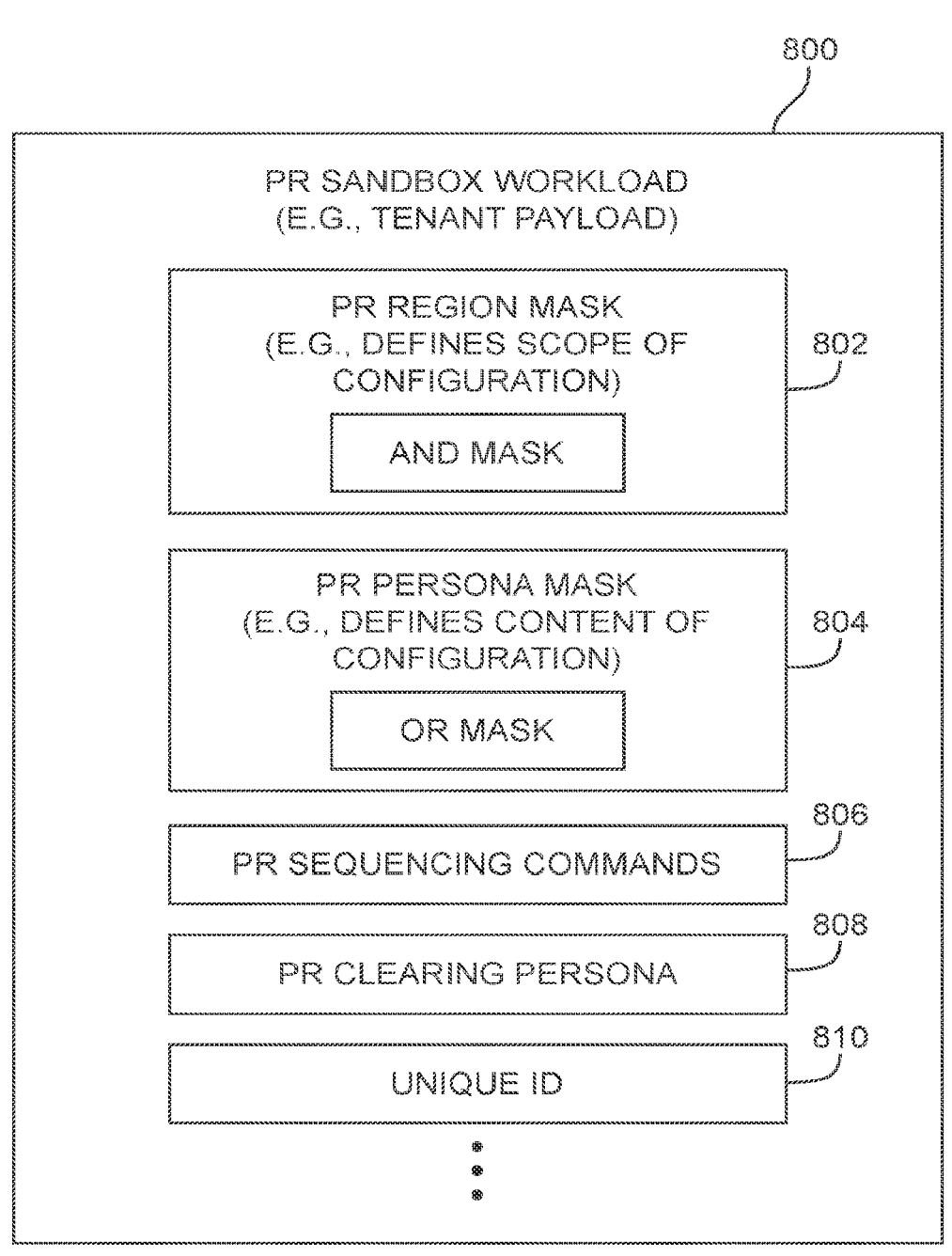
FIG. 8A is a diagram of an illustrative PR sandbox payload in accordance with an embodiment.

As described above, partial reconfiguration allows an FPGA platform owner to modify parts of a deployed FPGA configuration during runtime. Each PR sandbox region may be partially reconfigured using a PR sandbox workload (sometimes also referred to as a tenant payload). As shown in FIG. 8A, PR sandbox workload 800 may include a partial reconfiguration (PR) region mask 802, a partial reconfiguration (PR) persona mask 804, partial reconfiguration sequencing commands 806, partial reconfiguration clearing persona 808, one or more unique identifier(s) 810, etc.

Figure 8B:
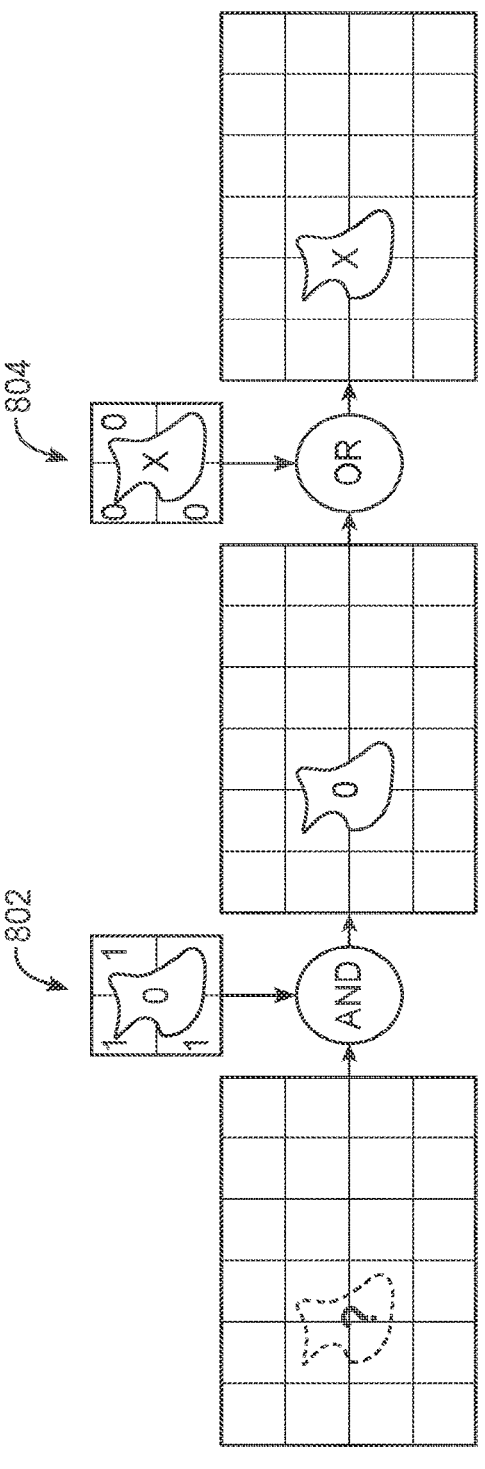
FIG. 8B is a diagram illustrating the operation of a partial reconfiguration (PR) region mask and a partial reconfiguration (PR) persona mask in accordance with an embodiment.

The PR region mask 802 may be used to define the scope of configuration change on the FPGA fabric and is sometimes referred to as a region "ownership" mask. The PR persona mask 804 may be used to define the content of the configuration change. The PR bitstream may be applied in a read-modified-write fashion (as an example) to deploy fine-grained modifications to a particular logic design. FIG. 8B illustrates how PR region mask 802 may be implemented as a logic AND mask that defines where a potential tenant can set or modify bits in the FPGA fabric. FIG. 8B also shows how PR personal mask 804 may be implemented as a logic OR mask that writes the actual content/persona into the region defined by the PR region AND mask.

Unique identifier (ID) 810 may be used to keep track of a given workload (e.g., any individual PR sandbox should be given a unique ID). For example, a cryptographic hash of the PR region mask 802 together with the target chip make/model can be used as a string that uniquely identifies a set of configuration bits that define a PR sandbox.

PR sequencing commands 806 define a sequence of steps to ensure successful partial reconfiguration of the FPGA fabric. For example, the timing and order of commands to reset or reconfigure fractions of the FPGA fabric should be assured by the FPGA device independently of the cloud service provider. For this purpose, the secure device manager on the FPGA may monitor the relevant parameters in the PR sequencing commands 806 during partial reconfiguration and raise an exception if violations are identified. Exceptions should be raised to the relevant PR requestor (e.g., either the tenant or the cloud service provider), followed by an appropriate clearing sequence to clear out a potentially "dirty" persona.

A persona may be marked as dirty if the desired partial configuration has unsuccessfully aborted or no longer needed by the tenant. In such situations, a reset/wipe sequence may be used to clear the configuration of the PR sandbox region and also any potential residual data remaining in intermediate buffers and memory (e.g., to ensure that no intermediate state remains in the PR sandbox). For instance, the clearing logic may be implemented as a dedicated PR clearing persona 808. The clearing persona 808 may be automatically loaded in between actual tenant workloads to clear buffers or memories owned by the previous tenant in that PR sandbox. Clearing persona 808 may be specific to a particular persona in order to minimize the additional latency for clearing sensitive data or may be a generic code that clears any data for a particular PR sandbox definition. If clearing persona 808 is specific to a particular persona, the clearing persona is embedded as part of the respective tenant workload (as illustrated in FIG. 8A). If the clearing persona is some generic clearing code, the clearing personas for the various defined PR sandbox regions may be embedded as part of the base static image and uploaded to the FPGA as part of the initial device configuration.

In scenarios where persona clearing cannot be assured (e.g., even after power-cycling the FPGA device), a complete wipe of the PR region may be performed. Steps and operations involved in ensuring successful partial reconfiguration and subsequent clearing of unneeded persona may effectively help provide temporal isolation to ensure that no sensitive information is leaking across time from a previous tenant to a new incoming tenant and is sometimes referred to as being part of a multitenancy mode (MTM) that is supported by the FPGA device using the secure device manager. When operated in the multitenancy mode, the SDM implements secure provisioning and life-cycle management of PR sandbox workloads.

One or more components of PR workload 800 such as the PR region mask 802 and PR persona mask 804 may be generated by the tenant using design tools 420 of FIG. 4. Such build process may be verified by a third party to confirm the spatial and temporal isolation of a given persona loaded into a given PR sandbox region. To enable verification of the security of the PR sandbox definitions and the overall FPGA platform configuration setup, components of the PR sandbox workload may be checked against the MTM sharing and allocation policy 610 (FIG. 6) to establish trust in the remote cloud infrastructure.

Figure 9A:
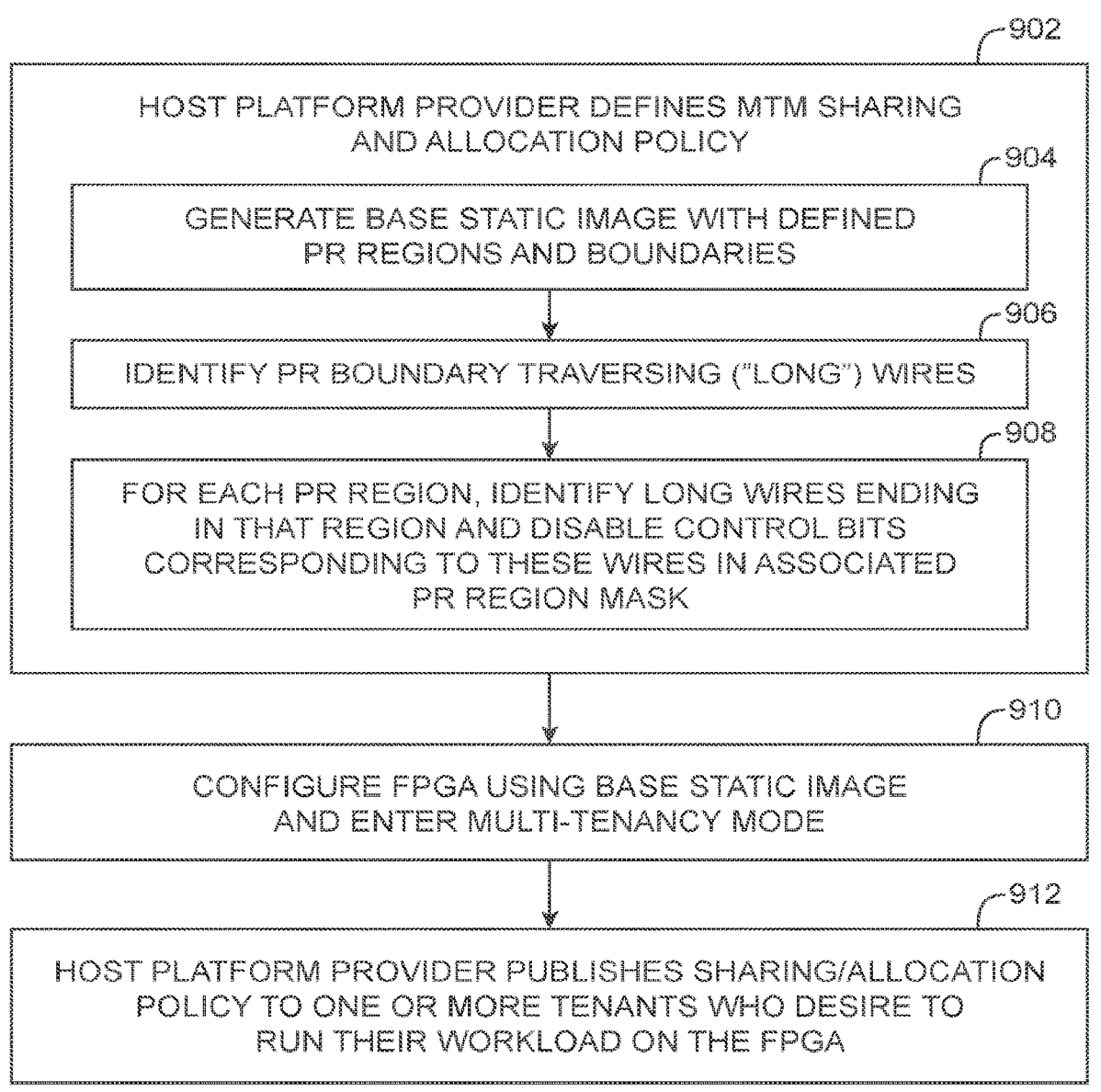
Figure 9C:
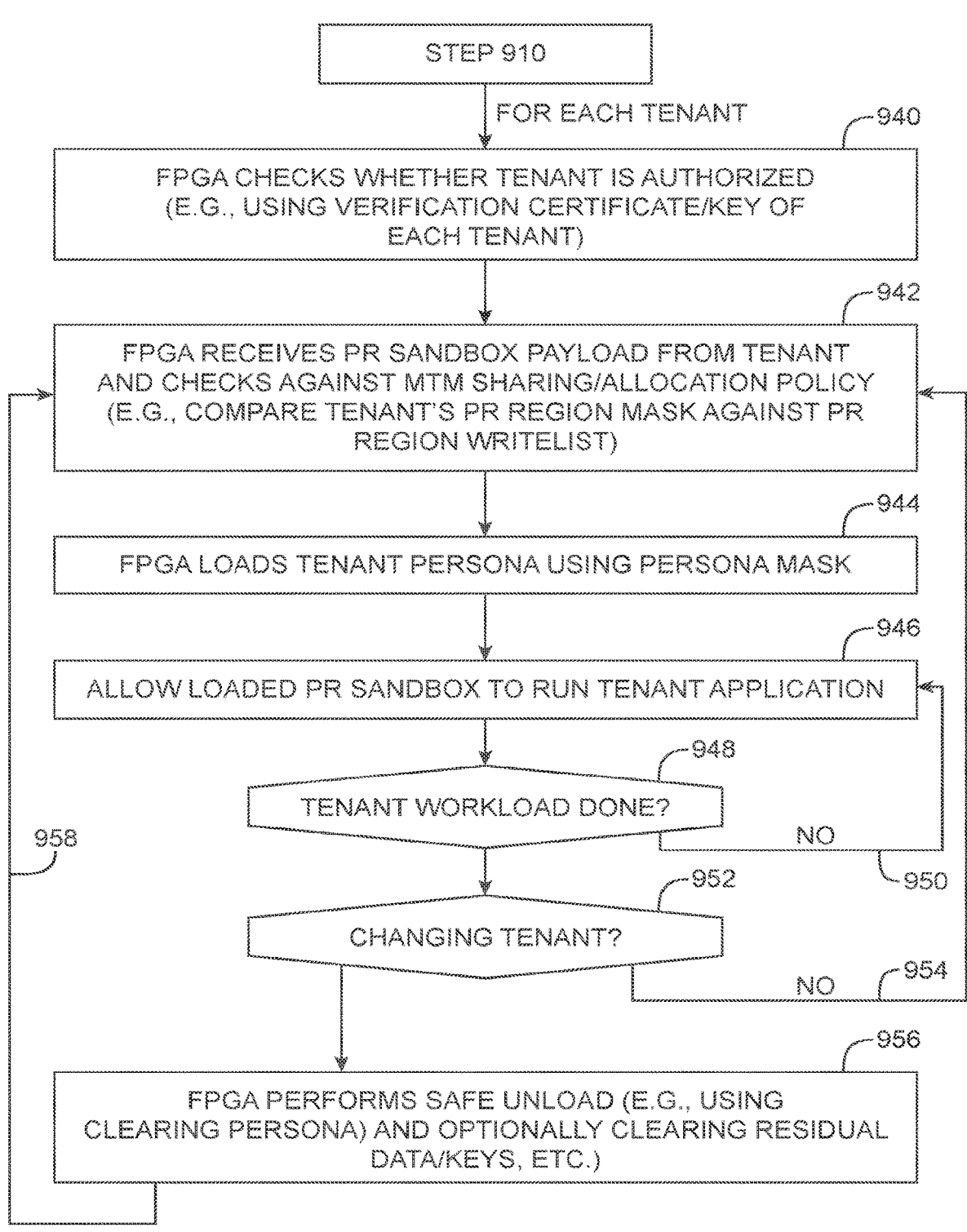

FIGS. 9A-9C are flow charts of illustrative steps for operating multitenancy system 600 of the type described in connection with at least FIG. 6. At step 902 in FIG. 9A, the host platform provider such as cloud service provider 602 (FIG. 6) may define a MTM sharing and allocation policy such as policy 610. At sub-step 904, the CSP may utilize logic design tools (e.g., design tools 420 of FIG. 4) to generate a base design such as base static image 612 with defined PR sandbox regions and boundaries. At sub-step 906, the CSP may identify the PR boundary-traversing wires (sometimes referred to as "long" wires). At sub-step 908, the CSP may identify, for each PR sandbox region, any long wires terminating in that PR region and disable the associated control bits corresponding to those wires in the respective PR region mask. Operated in this way, the disabled long wires are assigned to another PR sandbox or o the static region.

At step 910, the FPGA device 10 may be configured using the base static image generated by the CSP and may then enter multitenancy mode (MTM). When operated in the multitenancy mode, the FPGA device can enforce the agreed MTM sharing/allocation policy or contract for the lifetime of any deployed tenant workloads independently of the platform owner (typically the CSP). To support this, the secure device manager 650 on the FPGA may support the MTM mode by enforcing any PR sandbox load/unload constraints during runtime.

Upon entering multitenancy mode, the FPGA platform owner such as the CSP may be prevented from exiting the multitenancy mode. For example, after entering MTM, the FPGA may institute an owner lock-out mechanism by (for example) prohibiting the CSP from entering a debug mode or from returning to single-tenant operation (e.g., to prevent available on-chip debug features from compromising the confidentiality of the PR sandbox workloads). If desired, SDM 650 may also implement a management interface for the CSP to view current static and statistics associated with each PR tenant workload. For instance, the SDM may monitor the type and number of available versus used PR sandboxes, the energy consumed and the amount of hard IP blocks used per occupied PR sandbox, the latency of each PR region, etc. Moreover, the FPGA may offer a privileged access for the CSP (as opposed to a more restricted access for the tenants) to perform shutdown or to throttle one or more workload operations (e.g., to modify the current operating frequency of the FPGA chip).

At step 912, the CSP may publish the MTM sharing and allocation policy to existing or prospective tenants who desire to run their workload on the shared FPGA platform.

FIG. 9B show illustrative steps that can be performed by a tenant and the FPGA after step 912 of FIG. 9A. At step 920, a tenant may inspect and verify the MTM sharing and allocation policy 610 published by the CSP. For example, the tenant may validate the PR region mask in its own payload against the published peek/poke vectors in policy 610 to ensure there is no conflict (i.e., to validate the PR region mask against the known peek/poke vectors to make sure that the PR region mask has no overlap with the exclusionary peek/poke configuration bits).

At step 922, the tenant may use the MTM sharing and allocation policy 610 to generate a partial reconfiguration bitstream to fit within the target PR sandbox region on the FPGA (e.g., the tenant may use design tools 420 of FIG. 4 to generate the desired client persona).

At step 924, the FPGA may use the secure device manager to send its current device configuration to the tenant. At step 926, the tenant may inspect the FPGA device configuration and attest the FPGA device configuration (e.g., by confirming whether the received device configuration or setup matches with the expected base design in the published policy). Once FPGA attestation is complete, the tenant may upload its PR sandbox workload to the FPGA (at step 928). Processing may optionally loop back to step 920 for each tenant in the multitenancy system, as indicated by path 927.

FIG. 9C show illustrative steps that can be performed after step 910 of FIG. 9A and may therefore be optionally performed in parallel with step 912 or the steps of FIG. 9B. At step 940, the FPGA may check whether a prospective tenant is authorized (e.g., using the verification certificate or key of each tenant).

At step 942, the FPGA may receive the PR sandbox workload from the tenant and may compare the contents of the received workload against the published parameters in the MTM sharing and allocation policy 610. For example, the FPGA may check whether the received tenant workload matches with the corresponding components in the published sharing and allocation policy. The desired MTM partial reconfiguration must be authenticated by a valid tenant and match one of the PR whitelist regions declared in policy 610. To accomplish this, the SDM may first validate a signature of the PR sandbox bitstream (see certificate 605 in FIG. 6) against a list of tenant signing keys provided by the CSP. Upon a match, the SDM may then compute a unique identifier using the PR region mask included in the tenant workload and match it against the (white) list of allowed/declared PR region masks in policy 610.

If there is a match and assuming the target PR sandbox region is not currently in use, the PR process is started and the SDM will use the PR region mask (e.g., an AND mask) in the PR workload to define the scope of the partial reconfiguration (at step 944). For example, the FPGA may use the SDM to authorize the PR request and will load and PR content into the target PR sandbox region on the FPGA using the PR persona mask (e.g., an OR mask) in the PR workload.

At step 946, the FPGA may allow the loaded PR sandbox to run the tenant application while ensuring spatial isolation from other tenants currently occupying other PR sandbox regions on the FPGA. At step 948, the SDM may check whether the tenant workload is done. If the tenant workload is not done, processing may loop back to step 946 to continue running the tenant application (as shown by path 950). If the tenant workload is complete, the SDM may determine whether there is a tenant ownership change at the PR sandbox region (at step 952). If there is no tenant ownership change at the PR sandbox region, processing may loop back to step 942 to receive a new tenant workload from the same tenant (as shown by path 954).

If the FPGA detects that a new tenant will be occupying the PR sandbox region, the FPGA may perform a safe unload (e.g., using a clearing persona such as clearing persona 808 of FIG. 8A) and optionally clearing residual data and keys (step 956). As described above in connection with FIG. 8A, the clearing persona 808 may be automatically loaded in between actual tenant workloads to clear buffers or memories owned by the previous tenant in that PR sandbox to enforce temporal isolation between successive tenancies. Clearing persona 808 may be specific to a particular persona in order to minimize the additional latency for clearing sensitive data or may be a generic code that clears any data for a particular PR sandbox definition. In scenarios where persona clearing cannot be assured, a complete wipe of the PR region may be performed.

Although the methods of operations are described in a specific order, it should be understood that other operations may be performed in between described operations, described operations may be adjusted so that they occur at slightly different times or described operations may be distributed in a system which allows occurrence of the processing operations at various intervals associated with the processing, as long as the processing of the overlay operations are performed in a desired way.

EXAMPLES

The following examples pertain to further embodiments.

Example 1 is an integrated circuit, comprising: a static region that cannot be altered by partial reconfiguration; a first partial reconfiguration (PR) sandbox region configured using a first tenant workload; a second partial reconfiguration (PR) sandbox region configured using a second tenant workload; and a secure device management (SDM) circuit configured to provide spatial isolation between the first and second PR sandbox regions by preventing the first and second tenant workloads from interfering with each other.

Example 2 is the integrated circuit of example 1, wherein the first tenant workload optionally comprises a partial reconfiguration region mask that defines the scope of configuration, and wherein the first PR sandbox region is optionally configured using the partial reconfiguration region mask.

Example 3 is the integrated circuit of example 2, wherein the partial reconfiguration region mask is optionally implemented as a logic AND mask.

Example 4 is the integrated circuit of any one of examples 2-3, wherein the first tenant workload optionally further comprises a partial reconfiguration persona mask that defines the content of configuration, and wherein the first PR sandbox region is further configured using the partial reconfiguration persona mask.

Example 5 is the integrated circuit of example 4, wherein the partial reconfiguration persona mask is optionally implemented as a logic OR mask.

Example 6 is the integrated circuit of any one of examples 1-5, optionally further comprising programmable logic resources that are assigned to either the static region or one of the first and second PR sandbox regions.

Example 7 is the integrated circuit of any one of examples 1-6, optionally further comprising a routing connection coupling the first PR sandbox region to the second PR sandbox region, wherein the routing connection is assigned to either the static region or one of the first and second PR sandbox regions.

Example 8 is the integrated circuit of any one of examples 1-7, optionally further comprising a hard functional block that is assigned either to the static region or one of the first and second PR sandbox regions.

Example 9 is the integrated circuit of example 8, wherein the hard functional block optionally comprises a block selected from the group consisting of: a random-access memory (RAM) block and a digital signal processing (DSP) block.

Example 10 is the integrated circuit of any one of examples 1-9, optionally further comprising an additional padding area that surrounds the first and second PR sandbox regions and that is configured to mitigate electrical interference between the first and second PR sandbox regions.

Example 11 is the integrated circuit of any one of examples 1-10, wherein the SDM circuit is optionally further configured to provide temporal isolation between successive tenant workloads occupying the first and second PR sandbox regions.

Example 12 is the integrated circuit of example 11, wherein the SDM circuit optionally ensures the temporal isolation by using a clearing persona to clear out residual data when changing tenant workloads at either the first or second PR sandbox regions.

Example 13 is the integrated circuit of any one of examples 11-12, wherein the SDM circuit optionally ensures the temporal isolation by preventing the integrated circuit from entering a debug mode or returning back to a single-user operation.

Example 14 is the integrated circuit of any one of examples 1-13, wherein the first PR sandbox region optionally has a first unique identifier, and wherein the second PR sandbox region optionally has a second unique identifier.

Example 15 is the integrated circuit of any one of examples 1-14, wherein the SDM circuit is optionally further configured to monitor usage status and statistics for the first and second PR sandbox regions.

Example 16 is a method of operating an integrated circuit, comprising: receiving a multitenancy mode sharing and allocation policy from a host platform provider; configuring the integrated circuit using a base static image in the received multitenancy mode sharing and allocation policy; and operating the integrated circuit in a multitenancy mode that ensures temporal isolation between tenants running on a plurality of partial reconfiguration (PR) sandbox regions on the integrated circuit.

Example 17 is the method of example 16, optionally further comprising determining whether a prospective tenant is authorized using a verification certificate of the prospective tenant.

Example 18 is the method of any one of examples 16-17, optionally further comprising: receiving a partial reconfiguration (PR) sandbox workload from a tenant; and checking the received PR sandbox workload against one or more terms in the multitenancy mode sharing and allocation policy.

Example 19 is the method of example 18, wherein checking the received PR sandbox workload against one or more terms in the multitenancy mode sharing and allocation policy optionally comprises comparing a region mask in the PR sandbox workload of the tenant to a partial reconfiguration region whitelist in the multitenancy mode sharing and allocation policy.

Example 20 is the method of any one of examples 18-19, optionally further comprising: after checking the received PR sandbox workload against one or more terms in the multitenancy mode sharing and allocation policy, loading a tenant persona into a selected one of the PR sandbox regions using a persona mask in the PR sandbox workload.

Example 21 is the method of any one of examples 16-20, optionally further comprising: determining whether a new tenant is replacing a prior tenant in a given one of the PR sandbox regions; and in response to determining that the new tenant is replacing the prior tenant in the given one of the PR sandbox regions, performing a safe unload operation by loading in a clear persona associated with the prior tenant and clearing residual data from the prior tenant.

Example 22 is a system, comprising: a cloud service provider configured to define a multitenancy mode contract; a programmable integrated circuit that is configured using a base static image in the multitenancy mode contract; and a tenant operable to upload a tenant workload into a selected one of a plurality of partial reconfiguration regions on the programmable integrated circuit, wherein the programmable integrated circuit uses the multitenancy mode contract to determine whether the tenant is allowed to upload its tenant workload into the selected one of the plurality of partial reconfiguration regions.

For instance, all optional features of the apparatus described above may also be implemented with respect to the method or process described herein. The foregoing is merely illustrative of the principles of this disclosure and various modifications can be made by those skilled in the art. The foregoing embodiments may be implemented individually or in any combination.

What is claimed is:

1. An integrated circuit, comprising:
a static region of logic circuitry configured with a static design;
a first partial reconfiguration region configured with a first partial reconfiguration persona of a first user;
a second partial reconfiguration region configured with a second partial reconfiguration persona of a second user, wherein the first partial reconfiguration region and the second partial reconfiguration region are spatially isolated from one another without a direct connection between them; and
control circuitry to manage partial reconfiguration of the first and second partial reconfiguration regions during runtime.

2. The integrated circuit of claim 1, wherein the first partial reconfiguration region and the second partial reconfiguration region are decoupled from the static region during reconfiguration.

3. The integrated circuit of claim 1, wherein the static design comprises a host shell.

4. The integrated circuit of claim 1, wherein logic circuitry of the integrated circuit that are assigned to the static region are not assigned to the first partial reconfiguration region or the second partial reconfiguration region.

5. The integrated circuit of claim 1, wherein the control circuitry is to monitor one or more configuration bitstreams comprising the first partial reconfiguration persona or the second partial reconfiguration persona at the integrated circuit during runtime.

6. The integrated circuit of claim 1, wherein the integrated circuit comprises a field programmable gate array (FPGA).

7. A system comprising:
a host data processing system; and
an integrated circuit communicably coupled to the host data processing system, wherein the integrated circuit is configurable by the host data processing system to comprise:
a static region configured with a static design;
a first partial reconfiguration region configured with a first partial reconfiguration persona of a first user;
a second partial reconfiguration region configured with a second partial reconfiguration persona of a second user, wherein the first partial reconfiguration region and the second partial reconfiguration region are spatially isolated from one another without a direct connection between them; and
control circuitry to manage partial reconfiguration of the first and second partial reconfiguration regions during runtime.

8. The system of claim 7, wherein the first partial reconfiguration region and the second partial reconfiguration region are decoupled from the static region during reconfiguration.

9. The system of claim 7, wherein the static design comprises a host shell.

10. The system of claim 7, wherein logic circuitry of the integrated circuit that are assigned to the static region are not assigned to the first partial reconfiguration region or the second partial reconfiguration region.

11. The system of claim 7, wherein the control circuitry is to monitor one or more configuration bitstreams comprising the first partial reconfiguration persona or the second partial reconfiguration persona at the integrated circuit during runtime.

12. The system of claim 7, wherein the integrated circuit comprises a field programmable gate array (FPGA).

13. One or more tangible, non-transitory, computer-readable media comprising one or more bitstreams to configure an integrated circuit device, wherein the integrated circuit device, when configured, comprises:
a static region configured with a static design;
a first partial reconfiguration region configured with a first partial reconfiguration persona of a first user;
a second partial reconfiguration region configured with a second partial reconfiguration persona of a second user, wherein the first partial reconfiguration region and the second partial reconfiguration region are spatially isolated from one another, wherein the first partial reconfiguration region and the second partial reconfiguration region do not have a direct connection between them; and
control circuitry to manage partial reconfiguration of the first and second partial reconfiguration regions during runtime.

14. The one or more tangible, non-transitory, computer-readable media of claim 13, wherein the first partial reconfiguration region and the second partial reconfiguration region are decoupled from the static region during reconfiguration.

15. The one or more tangible, non-transitory, computer-readable media of claim 13, wherein the static design comprises a host shell.

16. The one or more tangible, non-transitory, computer-readable media of claim 13, wherein logic circuitry of the integrated circuit device that are assigned to the static region are not assigned to the first partial reconfiguration region or the second partial reconfiguration region.

17. The one or more tangible, non-transitory, computer-readable media of claim 13, wherein the control circuitry is to monitor one or more configuration bitstreams comprising the first partial reconfiguration persona or the second partial reconfiguration persona at the integrated circuit device during runtime.

18. An integrated circuit, comprising:
a static region configured with a static design;
a first reconfigurable partition region configured with a first reconfigurable module of a first user;
a second reconfigurable partition region configured with a second reconfigurable module of a second user, wherein the first reconfigurable partition region and the second reconfigurable partition region are spatially isolated from one another, wherein the first partial reconfiguration region and the second partial reconfiguration region do not have a direct connection between them; and
control circuitry to manage partial reconfiguration of the first and second reconfigurable partition regions during runtime.

19. The integrated circuit of claim 18, wherein the first reconfigurable partition region and the second reconfigurable partition region do not have a direct connection between them.

20. The integrated circuit of claim 18, wherein the first reconfigurable partition region and the second reconfigurable partition region are decoupled from the static region during reconfiguration.

21. The integrated circuit of claim 18, wherein the static design comprises a host shell.

22. The integrated circuit of claim 18, wherein logic circuitry of the integrated circuit that are assigned to the static region are not assigned to the first reconfigurable partition region or the second reconfigurable partition region.

23. The integrated circuit of claim 18, wherein the control circuitry is to monitor one or more configuration bitstreams comprising the first reconfigurable module or the second reconfigurable module at the integrated circuit during run-time.

\*    \*    \*    \*    \*